W. SCHLOEMILCH & P. F. PICHON.
WAVE DETECTOR FOR WIRELESS TELEGRAPHY.
APPLICATION FILED AUG. 17, 1909.
1,003,210.
Patented Sept. 12, 1911.
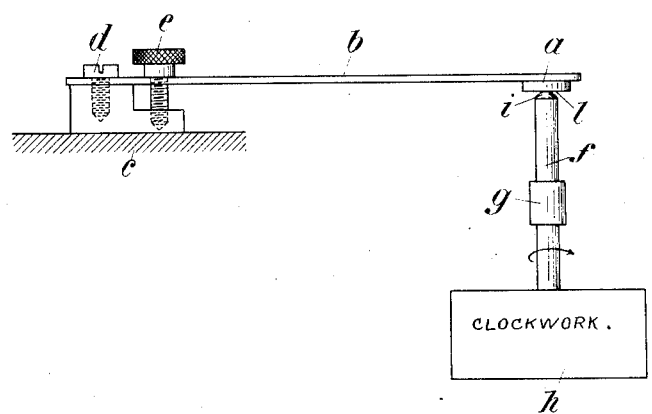

UNITED STATES PATENT OFFICE.

WILHELM SCHLOEMILCH, OF BERLIN, AND PAUL FERNAND PICHON, OF STEGLITZ, NEAR BERLIN, GERMANY, ASSIGNORS TO GESELLSCHAFT FÜR DRAHTLOSE TELEGRAPHIE M. B. H., OF BERLIN, GERMANY, A CORPORATION OF GERMANY.

WAVE-DETECTOR FOR WIRELESS TELEGRAPHY.

1,003,210. Specification of Letters Patent. Patented Sept. 12, 1911.

Application filed August 17, 1909. Serial No. 513,351.

*To all whom it may concern:*

Be it known that we, WILHELM SCHLOEMILCH, a subject of the King of Prussia, residing at Berlin, Germany, and PAUL FERNAND PICHON, a citizen of the Republic of France, residing at Steglitz, near Berlin, Germany, have invented certain new and useful Improvements in Wave-Detectors for Wireless Telegraphy, of which the following is a full, clear, and exact description, illustrated by the accompanying drawings.

As to certain features of the invention disclosed in this application, this is a division of our application Serial No. 311,678 filed April 14, 1906, which has now become a Patent No. 962,262, issued June 21, 1910. Said application relates to wave detectors in which the contact of two substances under suitable pressure is influenced by electric waves and in which the action of the substances is of a thermo-electric or rectifying character, and which action does not depend upon an auxiliary electromotive force or potential.

Among the substances mentioned in this application as suitable for the purpose described in combination with a non-oxidizable or difficultly oxidizable substance, is galena, which forms the subject matter of our present application. The arrangement of galena with any of the difficultly oxidizable substances as a detector may be in the simple manner as described and shown as an example in said above application, the difficultly oxidizable substance being arranged as a rod bearing with suitable pressure against a polished or crystallinic surface of the galena, or substantially the same arrangement may be used with one of the contact elements rotatable, so that when the wave sensitive contact between the two substances has been impaired by too strong a signal or by atmospheric disturbances of a similar character, a new portion of one of the substances will be brought to the proper relation with the other, instead of restoring the sensitiveness by tapping by hand. This latter construction, however, has not been originally disclosed in the aforesaid application and is merely illustrated here to show how the two substances may be held in contact with each other. When a detector provided with such a device is subjected to strong atmospheric discharges or too powerful signals, its sensitiveness is of course destroyed or impaired as before, but is immediately restored to its original sensitive state as fresh surfaces are brought into relation with each other by the rotation or movement of one or both elements and this renewal it has been found is very much more certain and effective with this method than if the detector were simply tapped by hand. Small fluctuations in pressure between the elements of the detector will of course occur when they are moved or rotated as above, but as the pressure between the contacts need not be sharply defined, such small fluctuations make practically no difference in the sensitiveness in practical operation of the type of detector under consideration. The arrangement may be made for instance so that one of the two contacts is mounted on a shaft connected with a clock work or other suitable device for imparting rotary motion to it, so that this motion is performed on the common axis through the contact point of both contacts as will now be described.

We have illustrated in the accompanying drawings diagrammatically as an example, a manner in which the two contact substances may be moved relatively to each other. In this diagram, $a$ represents a piece of galena, preferably copper plated on one side and preferably soldered at that side to the leaf spring $b$ and polished on its under side $l$. Instead of polishing the side $l$, a crystallinic surface of the galena may be used. The copper plating of the galena is advisable for two reasons: First, because if the galena were fastened to spring $b$ simply by a clamping screw or the like, another active detector might be produced thereby at the contact between the galena and its clamp, which might counteract the actual detector. Second, because of the great ohmic resistance of the galena, which in case of merely clamping this substance to its spring, might be high enough to destroy a considerable amount of useful energy. Spring $b$ is fastened by means of a screw $d$ to a block $c$ on which a thumb screw $e$ is provided for adjusting the tension of the spring and thus the contact pressure.

$f$ is a graphite rod supported by holder $g$ which in turn is fastened to the shaft of clock work $h$ of any suitable kind. Rod $f$ of the difficultly oxidizable substance is disposed so that its slightly rounded end $i$ will bear against contact surface 1 of the galena, the contact pressure being suitably adjusted by screw $e$ as above described.

After considerable use, of course, both contacts will be slightly worn off. It is therefore advisable to so arrange both that they may be readily renewed, which in view of the simple construction just described, may be easily done, for instance, by pulling contact rod $f$ out of sleeve or holder $g$ and by exchanging spring $b$ with the galena piece $z$.

What we claim is:

1. A wave detector for wireless telegraphy which operates without the aid of an electromotive force consisting of two contact bodies of different material and of self-restoring character, one of which consists of galena.

2. A wave detector for wireless telegraphy, consisting of two contact bodies one of which is formed of galena and the other of a material which oxidizes with difficulty, said contacts touching each other with a predetermined pressure, and operating without the aid of an auxiliary electromotive force.

WILHELM SCHLOEMILCH.
PAUL FERNAND PICHON.

Witnesses:
   HENRY HASPER,
   WOLDEMAR HAUPT.